Figure 1:
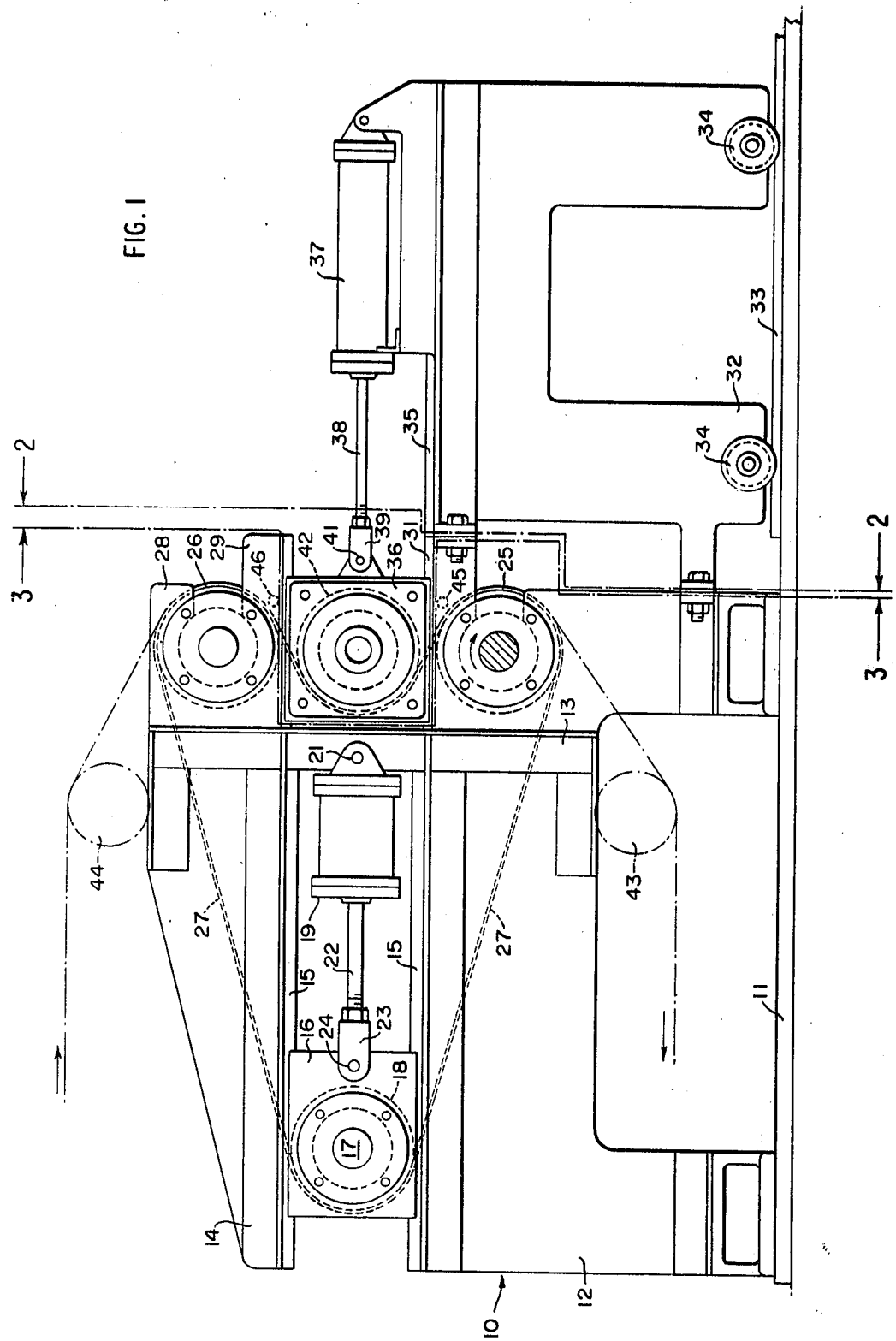

United States Patent
Ross

[15] 3,663,340
[45] May 16, 1972

[54] APPARATUS FOR PRODUCTION OF TEXTILE, LETTER PRESS AND PRINTING BLANKETS

[72] Inventor: William C. Ross, Winchester, Mass.
[73] Assignee: W. R. Grace & Co., Cambridge, Mass.
[22] Filed: June 24, 1970
[21] Appl. No.: 49,227

[52] U.S. Cl. .............................. 156/555, 156/582, 156/583, 100/153, 100/93 RP
[51] Int. Cl. ........................................ B31f 5/00, B30b 3/00
[58] Field of Search ............... 156/582, 583, 555; 100/93 RP, 100/153

[56] References Cited

UNITED STATES PATENTS

| | | |
|---|---|---|
| 2,442,443 | 6/1948 | Swallow ............................ 100/93 RP |
| 2,788,838 | 4/1957 | Crabbe et al. .......................... 156/555 |
| 3,563,166 | 2/1971 | Bajak, et al. ........................... 100/153 |

*Primary Examiner*—Douglas J. Drummond
*Attorney*—Theodore C. Browne, C. E. Parker, William L. Baker and Armand McMillan

[57] ABSTRACT

A rotary vulcanizing machine, particularly designed for the production of textile, letter-press and screen-print blankets. The compression belt, a glass cord reinforced rubber blanket, operates over small diameter (12 inches) rolls, and is tensioned by the thrust of hydraulic cylinders. The heated curing roll can be withdrawn from the machine and slid onto a wheeled carriage to move out of the way while a blanket to be cured is being dressed on the machine. The high strength of the compacting belt and its flexiblity while producing the same amount of compacting pressure eliminates the necessity of large diameter curing rolls for stainless steel belts saving cost, size, weight and floor space.

4 Claims, 3 Drawing Figures

Patented May 16, 1972
3,663,340
2 Sheets-Sheet 1

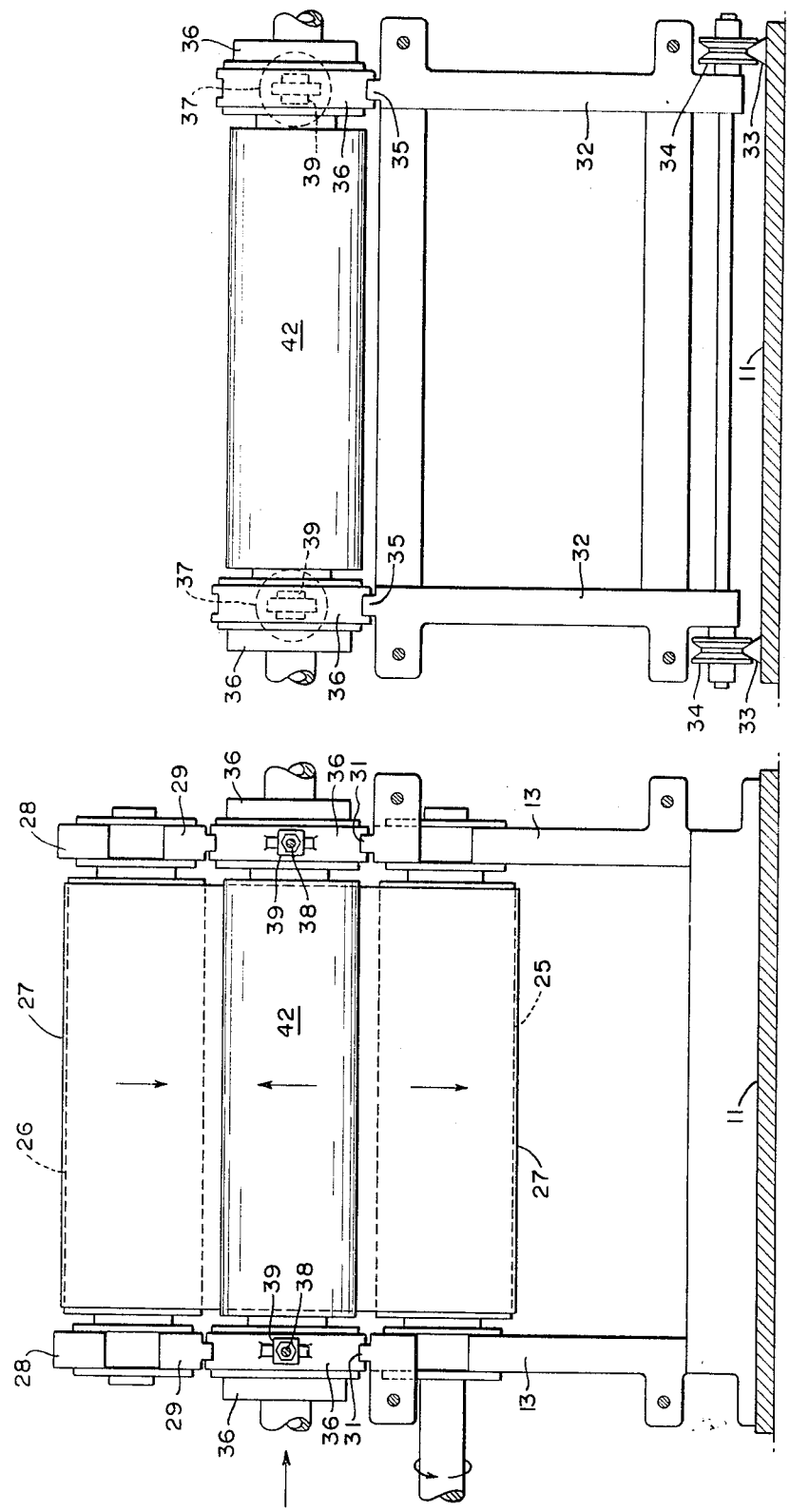

APPARATUS FOR PRODUCTION OF TEXTILE, LETTER PRESS AND PRINTING BLANKETS

This invention is concerned with rotary machines capable of curing long lengths of rubber, and particularly laminated rubber assemblies.

Making long lengths of blankets in which the cure is uniform, has presented very serious and expensive engineering problems to the manufacturer. As the blankets increased in width, these problems became more and more serious, for originally only short portions of the belt or blanket the size of ordinary hydraulic vulcanizing press platens could be vulcanized at one time. Vulcanizing in a succession of steps, although it cured and consolidated the belt produced step marks on the surface which unfitted it for many uses, particularly those associated with printing.

Next appeared enormous belting presses in which a large number of rams, each supporting a press platen, all of which were frequently covered by a single sheet of a thin metal, were simultaneously raised against the bolsters by a common hydraulic source.

Later came rotary curing machines in which belts, usually made from built-up structures of stainless steel, supported the carcass of the belt against pressure applied by a heated curing roll. These are enormous affairs because to prevent cracking it is necessary for the steel belt to work about a substantial radius. The immense size of these machines can be appreciated when it is realized that some textile blankets are cured on rolls approximately 90 inches long by 60 inches in diameter.

The development of a very strong, flexible blanket construction capable of withstanding very high tensions has made it possible to produce a machine so much smaller, lighter, and easily operated that a very considerable range of belts and blankets can be made on apparatus of reasonable size. For example: the entire set of rolls around which the curing blanket runs can be mounted on a frame 6 feet long and approximately 5½ feet high. The rolls, instead of being 60 inches in diameter, can be 12 inches. This reduced diameter offers the tremendous advantage that, for a given belt tension, the compressive force which can be exerted on the blanket carcass is very much higher. The 12-inch rolls, e.g., shows an advantage in compressive force exerted for a given tension of five times over that which may be exerted by 60-inch rolls with the belt under the same tension.

The small size of the machine also permits it to be easily loaded with the uncured carcass. Previously this has been a severe problem, for a long textile blanket or a belt is very heavy and difficult to place over huge rolls.

The characteristic features of the improved machine will appear from the specification and the drawings in which FIG. 1 is a left-side vertical elevation of the machine, FIG. 2 is a transverse elevation on the line 1—1 of FIG. 1, and FIG. 3 is a transverse elevation of the heated roll carriage on the line 3—3 of FIG. 1.

The machine, 10, includes a base, 11, a main frame, 12, having vertical side members, 13—13. Trackways, 15—15, which are formed on both the frame, 12, and the rearward extension, 14, of the frame, carry the journal blocks, 16—16, which support the bearings, 17—17, of a tensioning roll, 18. Blocks, 16, are moved in the trackway by a belt-tensioning hydraulic cylinder, 19, which is pinned to the member, 13, at 21. Its piston rod, 22, terminates in a yoke, 23, and is connected to the block, 16, by the yoke pin, 24.

Two fixed rolls, 25 and 26, in a vertical array support the compression belt, 27, which is tensioned by the rearward movement of the block, 16, and the tensioning roll, 18. The lower roll, 25, which is supported on the main frame, 12, is the driving roll. Upper roll, 26, is supported on journals which are carried by the rearwardly extending portions, 28—28 and 29—29, of the main frame, 12.

A trackway, 31, similar to trackway, 15, is formed in the lower face of the extension, 28, and the upper face of the outwardly extending portion of the frame, 12.

A separate movable carriage, 32, rolls on trackway, 33, which is formed by a continuation of the base, 11, and is supported on the wheels, 34—34. Its trackway, 35, formed on the upper face of the carriage, 32, exactly aligns with the trackway, 31, formed on the main frame, 12. In its rearward position, the carriage supports blocks, 36—36, which slide along the trackway, 35, pushed or pulled by the hydraulic cylinder, 37, and its associated piston rod, 38, yoke, 39, and yoke pin, 41. The blocks, 36—36, carry the steam-heated curing roll, 42, which is supplied by steam through conventional rotary joints which enter through its axial bore.

When the carriage, 32, is rolled forward to engage the machine, 10, piston rod, 38, pushes the blocks, 16—16, and the associated curing roll, 42, onto the trackways, 28 and 31. Locking means, 42, are provided to prevent the thrust of cylinder, 37, from forcing the carriage backwards.

When roll, 42, is forced against the face of the blanket carcass or a component blanket ply, that uncured element is placed under high compacting pressure which is exerted through the compression belt, 27, and against the roll, 42.

The tension on the belt which is developed by the thrust on the rolls, 18 and 33, can be determined by oil pressure in the hydraulic cylinder, 19 and 37.

If a smooth-faced blanket is to be produced, roll, 42, has a polished cylindrical surface. If an embossed blanket such as one having color-receiving grooves, is to be produced, an embossed roll is used.

In vulcanizing blankets or grooving and partially curing one of the constituent plies, if the blanket or ply is open ended, the uncured material is led from a remote unwinding reel over the guide roller, 44, and on top of the compression blanket, 27, which lies on roll, 26.

From there, the length is led downwardly to pass over roll, 25, and beneath guide roller, 43, and thence to a winding station. If an endless blanket is to be produced, the path of the blanket carcass through the machine is exactly the same, the difference being that at a position remote from the machine, a reversing roll must be located over which the blanket loop may be trained.

When open lengths or endless blankets are trained on the machine, roll, 42, is pulled backwards and rests on trackway, 35. The movable carriage, 29, is then rolled backwards and access is given to the front end of the machine. Because the hot curing roll, 42, can be pulled completely out of the way, operators running the curing machine can see that the uncured blanket carcass or the part to be vulcanized lies on the rolls squarely, and will run through the machine without weaving.

There are always slight inaccuracies when one is dealing with textiles or with rubber, for the textiles may twist or diamond slightly, and rubber will exhibit some thermal dimensional change. By dressing the machine so that the blanket is initially started accurately and then placing the carcass or ply under compacting pressure, practically no weaving or misalignment can occur.

By tensioning the belt, 27, and advancing the roll, 42, into contact with the carcass, moire effects can be eliminated for the blanket under that tension thereafter runs so accurately that the grooves in the face of a textile wash printing blanket at the stop and start position on the blanket loop, meet well within 3°, and engraved surface textile print blankets consequently produce no moire effects. In explanation, if accuracy can be held within 3° and preferably, as is possible on improved machinery, held to 1°, the moire fringes occur at such widely separated distances that they are completely unnoticeable on the printed goods.

When the machine is used as a base ply grooving machine, the base ply must be but partially cured.

Overcure of the rubber by radiation from the hot roll as the ply or even an assembled blanket enters and leaves the nip between the compression blanket and the roll, 33, is prevented by drilled air pipes, 45 and 46, which spread a fan of air across the rubber surface. The recommended pressure for this cooling blast is 70 psi. This will maintain the carcass temperature except in the nip itself approximately at ambient temperature. The volume of air per minute necessarily depends upon the width of the blanket which is being cured.

Tensile strengths approaching 2000 lbs. per linear inch can be achieved on the curing blanket, 27. So, very high compacting pressures can be developed if the blanket construction demands it. However, sufficient pressure for the vulcanization of ordinary blankets can be developed at tensions on the compression belt, 27, which lie between 400 and 500 lbs. per linear inch.

As the term is used in the specification and the claims, the word "rubber" holds no chemical significance. The word is used in its present-day sense to include any heat-curable elastomer.

I claim:

1. A continuous blanket curing machine comprising:
   a. a base,
   b. a main frame,
   c. side members projecting upwardly from the base, arranged to support two fixed rolls,
   d. forwardly and rearwardly extending trackways formed on the side members,
   e. a pair of journal blocks, slideably arranged on each trackway,
   f. two rolls journaled on the said side members,
   g. a heated roll supported in the journal blocks carried on the forwardly extending trackway,
   h. a tensioning roll supported on the journal blocks carried by the rearwardly extending trackway,
   i. a compacting belt trained over the said two rolls and the tensioning roll,
   j. means to tension the belt by forcing the said tensioning roll to the rear,
   k. a movable carriage having a trackway capable of being aligned with the said forwardly extending trackway,
   l. means mounted on the said carriage adapted to advance and retract the heated curing roll whereby a vulcanizable sheet may be compressed between the said heating roll and the compacting belt,
   m. means to lock the said movable carriage to the main frame to prevent separation of the carriage from the frame when the curing roll is forced into its curing position,
   n. means associated with one of the said fixed rolls for driving the assembly, and
   o. means to conduct heat into the said curing roll.

2. A machine as claimed in claim 1 wherein the compacting blanket is a glass cord reinforced rubber blanket, and wherein the rolls in the said machine are approximately 12 inches in diameter.

3. A machine as claimed in claim 1 wherein the said tensioning roll is moved by an hydraulic cylinder attached to the main frame, and wherein the said curing roll is moved by an hydraulic cylinder attached to the movable carriage.

4. A machine as claimed in claim 1 wherein the means to project air and thereby cool the surface of a blanket undergoing vulcanization beyond its contact area with the said hot roll and said compacting blanket is a pipe provided with a plurality of orifices designed to project a sheath of air substantially uniformly across the surface of the blanket at the entrance and exit nips of the said machine.

* * * * *